L. COATALEN.
OIL FILTER FOR USE ON INTERNAL COMBUSTION ENGINES.
APPLICATION FILED MAR. 20, 1917.
1,253,576.
Patented Jan. 15, 1918.
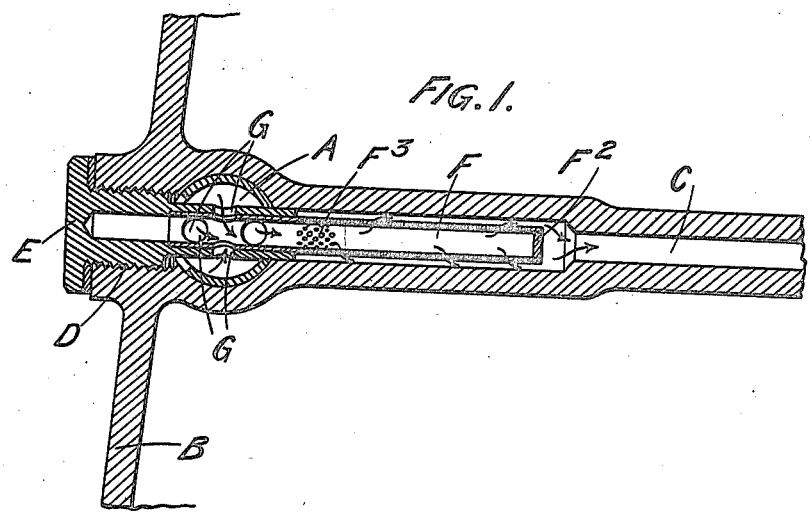
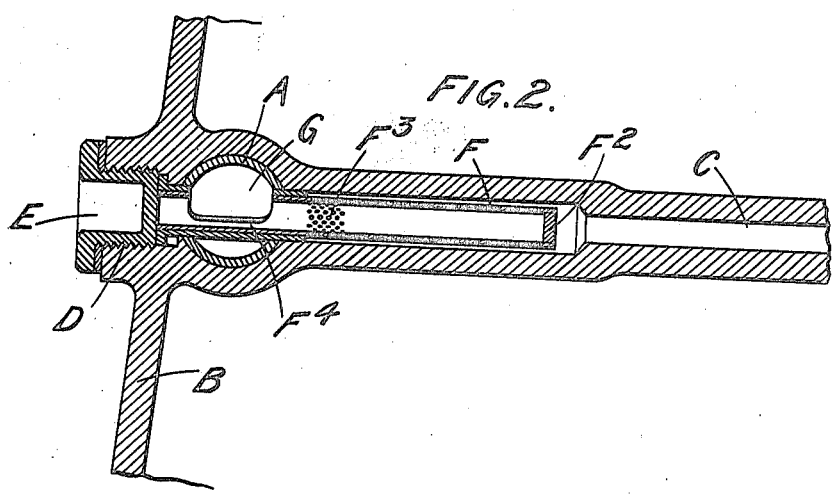
Inventor:
Louis Coatalen,
Atty's.

UNITED STATES PATENT OFFICE.

LOUIS COATALEN, OF WOLVERHAMPTON, ENGLAND, ASSIGNOR OF ONE-HALF TO SUNBEAM MOTOR CAR COMPANY LIMITED, OF WOLVERHAMPTON, ENGLAND.

OIL-FILTER FOR USE ON INTERNAL-COMBUSTION ENGINES.

1,253,576.

Specification of Letters Patent. Patented Jan. 15, 1918.

Application filed March 20, 1917. Serial No. 156,141.

*To all whom it may concern:*

Be it known that I, LOUIS COATALEN, a subject of the King of England, residing in Wolverhampton, Staffordshire, England, have invented certain new and useful Improvements in Oil-Filters for Use on Internal-Combustion Engines, of which the following is a specification.

This invention has for its object to provide a simple easily removable oil filter for use on internal combustion engines, which will deal with the oil just before it reaches the bearings.

In many internal combustion engines there is a main oil pipe running alongside the engine with branches at right angles leading to the bearings. According to this invention, there is inserted in the connection between each branch and the oil pipe a small filter tube which filters the oil as it passes from the pipe to the branch. The filter tube is easily removable in a direction at right angles to the main oil pipe.

In the accompanying drawings—

Figure 1 is a longitudinal section through one form of filter tube, and

Fig. 2 is a similar view of a modified construction.

Like letters indicate like parts throughout the drawings.

In both constructions illustrated, the main oil pipe A is cast in the wall B of the crank chamber and the branch pipe C, which may be a drilled passage, communicates with this, leading off from the main pipe at approximately a right angle thereto. Opposite the branch C is an aperture D into which screws a plug E and to the plug in Fig. 1 is attached a tube F with a closed end F², partly of filtering material or perforated at its right-hand part F³, which projects into the branch C and is so constructed that the oil has to pass through the filtering material to reach the branch C. Holes G are formed in a plain part of the filter tube or in the plug E, registering with the main oil pipe A, and by this means the oil enters the filter tube at the left and is compelled to pass out through the filtering material on its way to the branch. In this case the grit, etc., is trapped in the tube, which is easily removable by unscrewing the plug. The oil can also flow diametrically across or around the tube on its way down the main to the other branches.

In the case shown in Fig. 2 the tube F is separate from the plug E, so that it can be set in such a way that the sediment will collect below the inlet hole G in the part F⁴ and in the tube, any suitable means being employed to locate it properly, or to prevent it from turning. Thus when the tube F is withdrawn the sediment is removed.

In an alternative construction, the filter tube may be of slightly smaller diameter than the branch, and a space between the tube and the interior of the branch communicates with the small oil pipe while the interior of the filter tube communicates with the branch. In this case the oil flows from the outside of the filtering material into the interior and therefrom to the branch leading to the bearing.

As a filter can be provided for each branch a very efficient result is obtained with quite small filtering surfaces. Further, any scales or flakes of metal from the piping between the main filter and the branches are trapped at the last moment before reaching a bearing.

By this invention the filter can be located very close to the bearing and serves to trap any loose particles forminng in the ducts which are generally drilled in the crank case. These, not being removable, cannot be easily cleaned and are much more likely to release particles which in the ordinary way would not be filtered. By this invention they are, however, trapped, and in some cases if the branch filters can be made large enough the main filter may not be necessary.

What I claim as my invention and desire to secure by Letters Patent is:—

In a device of the class described, a main oil pipe, open ended branches traversing said main pipe at right angles thereto, a plug in the open end of each branch having a tubular portion extending across the main pipe and provided with openings for communication with the main pipe, and a filter tube carried by said plug extending across the main pipe provided with openings communicating with the openings in the plug.

In testimony whereof I have signed my name to this specification in the presence of two subscribing witnesses.

LOUIS COATALEN.

Witnesses:
JOHN MARSTON,
WM. ILIFF.